Nov. 21, 1961  M. B. ROGERS  3,009,828
METHOD OF PRODUCING CONTROLLED LOW PRESSURE ATMOSPHERES
Filed Feb. 17, 1960
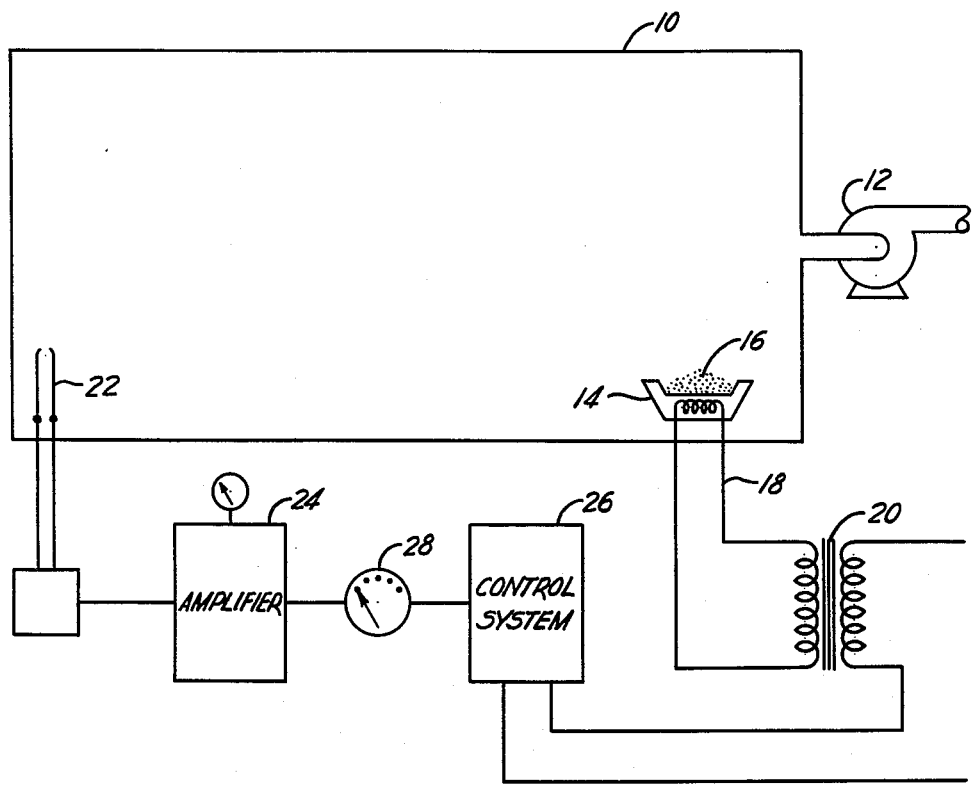
INVENTOR.
M. BERNARD ROGERS
BY
Brown, Critchlow, Flick + Peckham
His ATTORNEYS

United States Patent Office 3,009,828
Patented Nov. 21, 1961

3,009,828
METHOD OF PRODUCING CONTROLLED LOW PRESSURE ATMOSPHERES
Maxwell Bernard Rogers, Baltimore, Md., assignor to Catalyst Research Corporation, Baltimore, Md., a corporation of Maryland
Filed Feb. 17, 1960, Ser. No. 9,326
5 Claims. (Cl. 117—119)

This invention relates to a method and apparatus for providing controlled low pressure atmospheres in vacuum systems.

In the ordinary operation of a vacuum system, a closed chamber is evacuated by a suitable pumping arrangement. The degree of vacuum obtained is primarily controlled by such factors as the capability of the pump system used, the quality of the materials of construction and the actual construction of the vacuum chamber, and the degree of outgassing of the substances undergoing processing the system.

Generally speaking, production vacuum systems are designed with all of the foregoing factors in mind as well as the process that is to occur within the system. When a controlled atmosphere is desired, it is provided by pumping the system to a pressure lower than the desired pressure which one intends to create and then controllably leaking the intended atmosphere into the system from a container, for example a hydrogen cylinder where hydrogen is desired as the atmosphere. Cylinder gas is generally at a high pressure, so a pressure reduction system and an accurate leak arrangement are essential to provide the atmosphere. For these and other reasons, it is apparent that the provision of a controlled atmosphere in vacuum operations has been accomplished only with great difficulty and expense prior to the present invention.

It is therefore a primary object of the present invention to provide means and methods of supplying and maintaining controlled atmospheres of predetermined composition and pressure in vacuum operations.

Another object of the invention is to provide means and methods in accordance with the foregoing object that are simple to practice and to control and by which a desired atmosphere at a predetermined pressure is readily provided and maintained for a great variety of vacuum operations.

These and other objects are attained in accordance with the present invention in which a thermally decomposable material is provided within a vacuum system where a predetermined atmosphere is desired. The decomposable material used is so characterized that one of its decomposition products is gaseous and constitutes, chemically, the atmosphere that is wanted. The material is decomposed while within the vacuum system. In this general manner, atmospheres of predetermined composition and pressure are readily provided and maintained without encountering any of the problems heretofore evident in supplying an atmosphere in vacuum systems.

The material used in providing an atmosphere in a vacuum system in accordance with this invention is determined by the chemical constitution of the atmosphere that is desired. For example, when a hydrogen atmosphere is wanted a decomposable hydride is used. The alkali metal and alkaline earth metal hydrides, for example calcium hydride or lithium hydride, are satisfactory. Nitrogen is suitably supplied by the alkali metal and alkaline earth metal nitrides. Carbon dioxide can be supplied from decomposable carbonates, for example calcium carbonate as well as other alkaline earth metal carbonates. The decomposable oxides, for example sodium and potassium superoxide, constitute sources of oxygen when that is the desired atmosphere, but it will be understood that other decomposable oxides can be used as well.

For some applications mixed atmospheres are desired; accordingly, two or more decomposable compounds can be used for that purpose. The actual compound used will be largely determined by the atmosphere to be used and the temperature conditions within the system, it being evident that all compounds are not necessarily decomposable at the necessary rate at the same temperature. In general all of these materials are characterized by the fact that one of their decomposition products is gaseous and constitutes the atmosphere desired, and preferably the materials used exhibit negligible vapor pressure at room temperature and a gradual increase in vapor pressure of the decomposition gas product with increasingly elevated temperatures, at least throughout the temperature range to be used in the intended process. The vapor or dissociation pressures of the compounds that can be used can be found in standard references. For example, the dissociation pressure of calcium hydride ranges from 3.75 cm. of mercury at 765° C. to 25.31 cm. of mercury at 894° C., and to higher pressures at higher temperatures.

The decomposable compound is used in the present invention by placing it physically within the vacuum system. Generally, this involves disposing the compound in a boat, an open-ended tube, a crucible or other container in the system, for example the vacuum chamber. If the compound is subjected to radiant heat of a deleterious level, suitable shields can be interposed between it and the radiant heat source.

The type of container used can be determined by the nature of heating desired. For example, where induction or resistance heating is to be practiced, the container is made of an electrically conducting material, for example a metal or carbon. With radiant heating, a nonconducting container such as a ceramic crucible can be used.

The invention is especially applicable to apparatus and processes where a high vacuum is to be produced. Examples of these systems include glow discharge processing, sputtering processes, vacuum welding, vacuum melting, vacuum evaporation of metals, and electron beam processes, particularly where the desired pressure is below the order of 500 microns of mercury and suitably below about 100 microns of mercury. The process can also be used where metal-gas reactions are used, as in reactive sputtering processes where a gas may react with a sputtered metal so that a compound of the metal, such as an oxide, is the desired coating. Many of the foregoing processes operate at pressure on the order of 0.01 micron of mercury.

In practicing the present invention, the kinetic vacuum system in which the predetermined atmosphere is desired is provided with a quantity of the decomposable compound to result in the desired pressure. This compound is placed in its container within the system. After the vacuum has been drawn, as by use of a mechanical booster or diffusion vacuum pump, the atmosphere is provided by heating the compound until the pressure of the gas given off provides that desired in the system.

As will be apparent to those skilled in the art, differing conditions can be brought about within a vacuum system in accordance with this invention. For example, in any system that is evacuated, a residue of the original atmosphere remains. In the usual case this will be air and may be particularly undesirable when considering the objects of the process. By making use of the present invention, a surge in the discharge rate of the gaseous atmosphere from the decomposable compound can be made to occur by rapidly raising its temperature to above the level at which the desired vapor pressure is obtained. Hence, temporarily the pressure within the system exceeds the desired pressure and the atmosphere thus produced permeates the entire system, effectively purging the residual contaminants that may be present or at least greatly reducing their concentration. Thereafter the temperature of the decomposable compound can be lowered to that at which the desired pressure is produced and, after the pump system brings about equilibrium, the process can be carried on. In some processes contaminants are given off, as in the purification of metals; a surge of the nature just described can be made at intervals during the process to rid the system of those contaminants. Similarly, a final purge of a system at the end of a process can be made in like manner.

The invention will be described further in conjunction with the attached drawing which shows, schematically, a vacuum chamber with one form of associated equipment by which an atmosphere in accordance with this invention can be provided.

Referring now to the drawing, the numeral 10 indicates generally a vacuum chamber which for purposes of illustration can be considered to be a chamber in which a glow discharge process is being run in the presence of a reducing atmosphere. Communicating with this chamber 10 is a vacuum pump 12 having a capacity that can produce a lower pressure than is desired in chamber 10. The pump is shown schematically and any particular type of pump desired, as well as pump combinations, can be used. The details of the pump construction and utilization form no part of the present invention and such details are readily available in numerous sources to those skilled in the art. In the lower portion of chamber 10 is a container 14 made of an electric conducting substance, i.e. a metal or carbon. Within the container 14 is a mass 16 of the decomposable compound; for purposes of illustration this can be considered to be calcium hydride. A cable 18 electrically connected to the container 14 extends out of the vacuum chamber 10 to a transformer 20.

A sensing gauge 22 capable of sensing and indicating pressure is extended into the chamber in another portion thereof. Many gauges capable of this function are available. In the case of an ionization gauge, the actuating principle may be the ion current suitably amplified. An alternate and simpler method would employ the principle of using the indicating needle of the pressure gauge to make and break the circuit at preset values. The output of sensing gauge 22 is amplified by amplifier 24. The amplifier 24 in turn is electrically connected to a power control system 26 through a meter 28 having pointer contacts adapted to actuate the appropriate relay circuit. Meter 28 is in series with the regular indicating meter of the vacuum gauge. The relay circuits (not shown) are connected to transformer 20, hereinbefore mentioned, to control its output and, therefore, the heat supplied to the decomposable compound.

In operation with the calcium hydride in container 14 within the system, the vacuum chamber 10 is evacuated to below the desired pressure by means of pump 12. The sensing gauge indicates the pressure during evacuation. As the pressure goes below that desired, the output of the gauge registers on the meter 28, which cuts in a circuit feeding current to transformer 20. That in turn heats the calcium hydride by permitting current to pass into container 14. The heating of the calcium hydride gives off hydrogen at a vapor pressure fixed by the temperature to which it is heated.

The vacuum systems with which the present invention is concerned are kinetic. In other words, they are not sealed off completely and a constant leak occurs. The rate of leak is, of course, a parameter of each particular system. For that reason among others, such systems are continuously evacuated during use to maintain the desired low pressure and the pump in effect simply establishes an equilibrium; that is, it evacuates to the desired pressure and thereafter continues evacuation at about the rate of leak into the system. Consequently, to maintain an atmosphere as in this invention, the atmosphere generation will occur generally over a large period of the process. If the pressure increases or decreases from the desired pressure, as a consequence of the process being practiced, a decrease or increase in heating the decomposable compound will permit the system to maintain the equilibrium pressure.

Considering a specific application in which a hydrogen atmosphere is desired at a pressure of one micron over a period of 10 hours, with a pumping speed at that pressure of 25 cubic feet per minute, the quantity of calcium hydride required to provide diatomic hydrogen would be but 10 grams if only 10 weight percent of the hydride were utilized. Of course at higher pressures, relatively higher quantities of hydride would be required.

In a typical use of the invention, in conjunction with a process of coating a copper strip with calcium metal by vacuum evaporation, the following practice can be followed. A glass bell jar, 30 inches high and having an outside diameter of 18 inches, is used as the vacuum vessel. A vacuum gauge is used to note the system pressure during operation. A four inch oil diffusion pump backed by a 100-liter per minute mechanical pump is provided as the pumping system. The strip to be coated is placed within the bell jar along with a crucible containing calcium metal, the latter for subsequent evaporation to coat the copper strip. Conventional induction heating equipment is used to evaporate the calcium at the desired time. A tantalum boat containing calcium hydride is also placed in the vessel, suitably mounted by electrodes so that it can be heated by resistance heating. These electrodes are attached to a manually controlled variable transformer capable of heating the boat to a high temperature to decompose the hydride. For a 1 by 4 inch boat ¼ inch deep, 200 amperes at 10 volts will provide adequate power.

In operation, the bell jar is evacuated below $5 \times 10^{-4}$ mm. of mercury. When the vacuum gauge indicates this pressure, the power to the tantalum boat is turned on to heat the calcium hydride. A gradual pressure rise is shown by the gauge; heating is adjusted to bring the pressure to an equilibrium pressure of about $3 \times 10^{-2}$ mm. of mercury. At this condition of the system, a glow discharge using D.C. power, is struck so that the target (the copper strip) is negative and the remainder of the system is positive and ground. This completes outgassing of the target surface while the controlled low pressure hydrogen atmosphere is present. Experience has shown that outgassing in the presence of hydrogen facilitates obtaining an adherent coat of calcium. Experiment has shown that about 10 to 20 minutes at this condition is sufficient to effect adherence of subsequently deposited calcium.

When the outgassing period expires, the glow discharge is turned off and the power is cut off from the tantalum vessel, thereby effectively stopping the evolution of hydrogen. The system then pumps down to $10^{-4}$ mm. of mercury. At this pressure, power is supplied to the crucible containing the calcium to heat it sufficiently to evaporate it, whereupon the strip is coated. Thereafter, the evaporation is stopped and the system is opened to remove and recover the coated strip.

In the foregoing example, it will be noted that use of my invention occurred through but part of the process. That is not an unusual practice. It emphasizes the importance and simplicity of the invention, for the difficulties can easily be imagined of trying to provide such a low pressure hydrogen atmosphere from a cylinder with its associated equipment. Using my process brings about that result with particular ease.

The quantity of decomposable compound that is to be used for any given practice is readily determinable by routine stoichiometric computations. In practice, it has been found convenient to roughly calculate the quantity of gas needed, and then use a sufficient quantity of the compound to provide a safety factor of 10 to 20. Excess decomposable compound does not interfere with the process.

In the foregoing example, the provision of the hydrogen atmosphere was manually controlled. It can readily be made automatic by making the transformer responsive to the vacuum gauge and providing a timer to shut off power to the transformer after a predetermined time.

From the foregoing description and discussion, it is evident that the present invention constitutes a convenient way of providing an atmosphere of predetermined composition and pressure in a vacuum system. The ease of application and the fact that the invention can be made essentially automatic are further considerations showing its particular utility.

In accordance with the provisions of the patent statutes, I have explained the principle of my invention and have described and illustrated what I now believe to represent its best embodiment. However, it should be understood that, within the scope of the appended claims, the invention can be practiced otherwise than as specifically illustrated and described.

I claim:

1. In the operation of a vacuum zone in which an atmosphere at a predetermined pressure and of predetermined composition is desired and in which a vacuum is maintained by continuously withdrawing the atmosphere within said zone, the steps of providing such predetermined atmosphere comprising placing within said zone a solid thermally decomposable compound, a gaseous decomposition product of which constitutes the predetermined atmosphere, drawing a vacuum in said zone to a pressure below said predetermined pressure, and then heating said compound at a temperature sufficient in conjunction with said vacuum in said zone to provide said atmosphere at said predetermined desired pressure.

2. In a vacuum chamber in which combination with a pump is provided to withdraw the atmosphere from within said chamber and reduce its pressure to a predetermined level, means to provide an atmosphere of predetermined pressure and composition comprising a container in said chamber, the inside of said container being in open communication with the inside of said chamber, a solid thermally decomposable compound within said container, said compound being characterized in that one of its decomposition products comprises a gaseous atmosphere that is desired within said chamber, and means associated with said container adapted to heat said compound to a level sufficient to provide the desired pressure of said atmosphere within said chamber.

3. A vacuum chamber in accordance with claim 2 including means to sense pressure within said chamber and means actuated by said pressure sensing means to control heat input to said compound.

4. Apparatus in accordance with claim 2 including shielding means about said container to shield said compound therein from radiant heat.

5. That method of producing and maintaining an atmosphere at a predetermined pressure and a predetermined composition in a vacuum zone which comprises drawing a vacuum in said zone to a pressure below that desired, while continuously drawing said vacuum heating within said zone a solid thermally decomposable compound selected from the group consisting of alkali metal and alkaline earth metal hydrides, alkaline earth metal carbonates and alkali metal oxides to a temperature sufficient to produce a pressure of the normally gaseous component of said compound just above the desired pressure for said zone, thereby purging said zone of residual undesired gases, and then lowering the temperature of said compound to a level to produce the predetermined pressure desired.

References Cited in the file of this patent

UNITED STATES PATENTS 2,796,555    Connor _____ June 18, 1957

OTHER REFERENCES

Dushman: "Vacuum Technique," 1949, John Wiley & Sons, Inc., New York, pages 361, 362, 667, 670 and 679 relied on.